United States Patent [19]
Rauznitz et al.

[11] Patent Number: 5,680,309
[45] Date of Patent: Oct. 21, 1997

[54] CONTROL SYSTEM FOR AUTOMATIC RESUMPTION OF SPEED CONTROL AFTER GEAR CHANGE

[75] Inventors: Peter Rauznitz, Columbus; Mary L. Till, Indianapolis; Jimmie J. Trueblood, Columbus, all of Ind.

[73] Assignee: Cummins Engine Company, Inc., Columbus, Ind.

[21] Appl. No.: 476,340

[22] Filed: Jun. 7, 1995

[51] Int. Cl.$^6$ .................. B60K 31/00; B60K 41/04
[52] U.S. Cl. .................. 364/426.041; 364/426.043; 364/424.093; 180/170; 477/108; 477/125
[58] Field of Search .................. 364/426.04, 424.05, 364/431.07, 426.041, 426.043, 426.045, 424.084, 424.085, 424.093; 180/170, 179; 477/79, 80, 107, 108, 109, 125; 123/349, 350, 352; 192/3.61

[56] References Cited

U.S. PATENT DOCUMENTS

| | | | |
|---|---|---|---|
| 4,535,864 | 8/1985 | Tanigawa et al. | 180/177 |
| 4,597,465 | 7/1986 | Burney | 180/176 |
| 4,698,762 | 10/1987 | Moriya et al. | 364/424.1 |
| 4,747,326 | 5/1988 | Braun | 74/866 |
| 4,890,231 | 12/1989 | Frantz | 364/426.04 |
| 4,896,267 | 1/1990 | Frantz et al. | 364/426.04 |
| 4,933,851 | 6/1990 | Ito et al. | 364/424.1 |
| 5,012,419 | 4/1991 | Yamamoto | 364/426.04 |
| 5,019,986 | 5/1991 | Londt et al. | 180/179 |
| 5,058,698 | 10/1991 | Yoshida et al. | 180/179 |
| 5,088,351 | 2/1992 | Miyake et al. | 180/179 |
| 5,393,276 | 2/1995 | White et al. | 477/91 |

*Primary Examiner*—Kevin J. Teska
*Assistant Examiner*—Tan Nguyen
*Attorney, Agent, or Firm*—Woodard, Emhardt, Naughton, Moriarty & McNett

[57] ABSTRACT

A method for automatically resuming vehicle speed control after a gear change of the vehicle's manual transmission. The method may be implemented as a subroutine in the vehicle's general control software. After disengagement of the clutch, the subroutine suspends the automatic speed control system and then periodically checks to determine if the driver has shifted gears within a predetermined time period. This determination is made by checking to see if the clutch has once again been engaged with the transmission in gear. If this occurs within the predetermined time period, then the control system automatically resumes the speed control of the engine. The determination of whether the transmission has been placed into another gear is made by an examination of calculated gear ratios, rather than by the addition of a hardware sensor.

20 Claims, 5 Drawing Sheets

CONTROL SYSTEM FOR AUTOMATIC RESUMPTION OF SPEED CONTROL AFTER GEAR CHANGE

TECHNICAL FIELD OF THE INVENTION

The present invention generally relates to automotive control systems and, more particularly, to a control system for automatic resumption of speed control after a gear change.

BACKGROUND OF THE INVENTION

Various kinds of speed control systems, commonly referred to as "cruise control" systems, have been employed in the past for automatically maintaining a desired vehicle speed. Such control systems characteristically include some type of vehicle or engine speed sensor that monitors actual vehicle or engine speed, which the control system then compares to a "set" vehicle speed, which is the speed at which automatic control is desired. The set speed is commonly entered into the control system as the actual vehicle speed when a set switch is depressed by the driver.

The speed control system generates an error signal by comparing the actual vehicle speed to the set speed. The error signal is then used to control an actuator coupled to the fuel pump or to the vehicle throttle in order to change the engine speed until the error signal is substantially zero (i.e. until the actual vehicle speed is equal to the set speed).

Vehicular transmissions are generally provided with a plurality of forward gear ratios in order to allow a narrow range of engine speeds to be maintained over a wide range of vehicle speed. Where the speed control system is used on a vehicle having a manual transmission, it may occasionally be necessary for the driver of the vehicle to manually shift the transmission to another gear while the speed control system is operational. This may be necessary, for example, if the vehicle encounters an uphill slope. In such situations, it is necessary to suspend operation of the speed control system during the shift, otherwise the system will operate to dramatically increase the engine speed when the clutch is disengaged.

Several methods have been developed in the prior art to suspend operation of the speed control system when the clutch is disengaged. For example, in U.S. Pat. No. 4,597,465 to Burney, an overspeed sensor monitors the engine speed and suspends operation of the speed control system in the event of a sudden increase in the engine speed which occurs when the clutch of a vehicle having a manual transmission is disengaged. However, most prior art systems simply utilize a switch that senses depression of the vehicle clutch pedal, the output of the switch being used to trigger suspension of the speed control system.

Once the driver has completed shifting the transmission to another gear, it is desirable to resume operation of the speed control system. It will be appreciated by those skilled in the art that the speed control system cannot be simply resumed when the clutch pedal sensor indicates that the clutch has been engaged. This is because the driver may have shifted the transmission into neutral position, in which case resumption of speed control would result in a dramatic increase in engine speed. Therefore, most prior art systems simply incorporate a resume switch which must be pressed by the driver in order to reactivate the speed control system. In practice, most drivers find it annoying to have to press the resume switch after every gear change. In order to alleviate this annoyance, prior art systems have been proposed which incorporate a sensor switch on the transmission shift lever.

Once a shift has been executed by the driver (as indicated by the shift lever sensor) and the clutch has been engaged (as indicated by the clutch pedal sensor), the speed control system is automatically resumed, without the need for the driver to depress a resume switch. There is a problem with this solution, however, in that extra hardware is required, including the electromechanical shift lever sensor and the additions to the vehicle wiring harness, which increase both the complexity and the weight of the wiring harness.

In light of the above defined problems, there is therefore a need in the prior art for a vehicle speed control system which allows for automatic resumption of speed control after a gear change, without requiring driver input and without requiring additional hardware to be added to the vehicle. The present invention is directed toward meeting these needs.

SUMMARY OF THE INVENTION

The present invention relates to a method for automatically resuming vehicle speed control after a gear change of the vehicle's manual transmission. The method may be implemented as a subroutine in the vehicle's general control software. After disengagement of the clutch, the subroutine suspends the automatic speed control system and then periodically checks to determine if the driver has shifted gears within a predetermined time period. This determination is made by checking to see if the clutch has once again been engaged with the transmission in gear. If this occurs within the predetermined time period, then the control system automatically resumes the speed control of the engine. The control system may optionally require that the transmission be placed into another gear. The determination of whether the transmission has been placed into the same or another gear is made by an examination of calculated gear ratios, rather than by the addition of a hardware sensor.

In one form of the invention, a method for automatic suspension and resumption of a vehicle speed control system during a gear change of a manual transmission of the vehicle is disclosed, comprising the steps of sensing a start of the gear change, suspending operation of the speed control system, beginning measurement of an elapsed time, sensing a completion of the gear change and resuming operation of the speed control system if the elapsed time is less than a predetermined limit.

In another form of the invention, a method for automatic suspension and resumption of a vehicle speed control system during a gear change of a manual transmission of the vehicle is disclosed, comprising the steps of sensing disengagement of a clutch of the vehicle, suspending operation of the speed control system upon disengagement of the clutch, beginning measurement of an elapsed time upon the suspension of operation of the speed control system, sensing a completion of the gear change, completing measurement of the elapsed time upon the completion of the gear change and resuming operation of the speed control system if the elapsed time is less than a predetermined limit.

In another form of the invention, a method for automatic suspension and resumption of a vehicle speed control system during a gear change of a manual transmission of the vehicle is disclosed, comprising the steps of sensing disengagement of a clutch of the vehicle, suspending operation of the speed control system upon disengagement of the clutch, beginning measurement of an elapsed time upon the suspension of operation of the speed control system, terminating the method if a current value of the elapsed time is not less than a predetermined limit, determining whether the clutch of the vehicle has been engaged, waiting for a predetermined time period, determining a current gear ratio of the vehicle after expiration of the predetermined time period, retrieving a plurality of previously determined gear ratios of the vehicle and resuming operation of the speed control system if the current gear ratio and the plurality of previously determined gear ratios are all within a predetermined boundary.

In another form of the invention, a method for automatic suspension and resumption of a vehicle speed control system during a gear change of a manual transmission of the vehicle is disclosed, comprising the steps of sensing a start of the gear change, suspending operation of the speed control system, beginning measurement of an elapsed time, sensing a completion of the gear change, resuming operation of the speed control system if the elapsed time is less than a predetermined limit and validating the resumption of the operation of the speed control system.

DESCRIPTION OF THE PREFERRED EMBODIMENT

Figure 1:
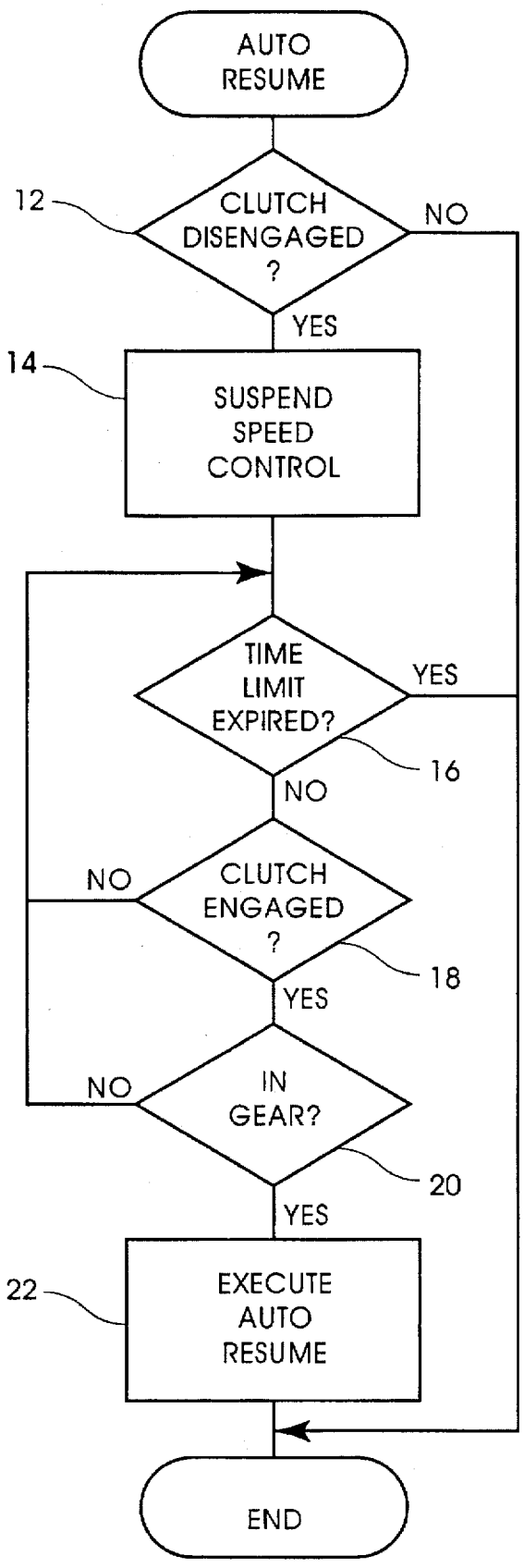
FIG. 1 is a flow chart of a first embodiment gross automatic resume method of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a flow chart of the first embodiment gross (non-detailed) automatic resume method of the present invention. As with the other method flow charts presented herein, it is intended that the method of FIG. 1 be executed by the electronic control module (for example, a microcomputer and associated circuitry) which commonly executes many of the control functions implemented on an internal combustion engine.

The gross auto-resume method of FIG. 1 begins at step 12 which determines if the clutch of the vehicle has been disengaged. This may be determined in any convenient manner, such as a sensor switch located on the vehicle clutch pedal. If step 12 determines that the clutch has not been disengaged, then the auto-resume method of FIG. 1 terminates. If, however, step 12 determines that the clutch has been disengaged, then it is necessary to suspend the operation of the speed control system at step 14 in order to prevent a rapid increase in the engine speed. After the speed control system has been suspended at step 14, it is desirable to reactivate the speed control system if the transmission is shifted into another gear within a predetermined time period. Therefore, the process checks at step 16 to see if this predetermined time period has expired. If the time period has expired, then the process is terminated. If, however, the time period has not yet expired, then step 18 determines whether the clutch has once again been engaged. This determination may be made by means of the same sensor that was used to determine clutch disengagement at step 12. If the clutch has not been engaged at step 18, the process returns to step 16. If, however, the clutch has been engaged at step 18, the process proceeds to step 20 which determines if the transmission has been placed in gear (i.e. the transmission is not in neutral).

It will be appreciated by those skilled in the art that the gear ratio values used by the present invention may be sensed or calculated in a variety of ways. In a preferred embodiment of the present invention, the gear ratios are calculated by sensing engine speed and the speed of the rear axle. With the rear axle speed (and knowing the rear differential gear ratio and the vehicle tire size, which are programmed inputs), the vehicle road speed may be calculated. The gear ratio may then be calculated as the ratio between the engine speed and the road speed.

If step 20 determines that the transmission has not been placed in gear, then the transmission is in neutral and the process returns to step 16. If, on the other hand, the transmission is in gear at step 20, then the process continues to step 22 which executes an automatic resumption of the speed control system. The process then ends after step 22.

It will be appreciated by those skilled in the art that the gross auto-resume method of FIG. 1 may be executed as a subroutine in a larger control system program being executed by the vehicle electronic control module (ECM). After disengagement of the clutch, the subroutine suspends the automatic speed control system and then periodically checks to determine if the driver has shifted gears within a predetermined time period. This determination is made by checking to see if the clutch has once again been engaged with the transmission in gear. If this occurs within the predetermined time period, then the control system automatically resumes the speed control of the engine.

The method of FIG. 1 allows the driver to shift between gears whenever required to do so by the driving conditions, without exiting automatic speed control. As long as the shift is completed within the predetermined time period, the speed control system will execute an auto-resume and once again take over management of the vehicle speed.

Those skilled in the art will recognize that the method of FIG. 1 represents a preferred method of resuming automatic speed control of a vehicle after the transmission has been shifted, in contrast to the prior art systems in which the driver had to depress a resume switch. However, from a hardware design standpoint, it is desirable that the method of FIG. 1 be implemented without requiring additional hardware to be added to the vehicle. This is because addition of extra hardware to the vehicle design increases costs, increases complexity (with the attendant decreases in manufacturability and reliability), and increases the weight of the vehicle, thereby having an adverse impact on vehicle fuel economy. In other words, it is preferable that the auto-resume function as illustrated in FIG. 1 be implemented in software in the electronic control module, rather than as hardware additions to the vehicle. The auto-resume method illustrated in FIG. 2 and described hereinbelow meets these requirements.

Figure 2:
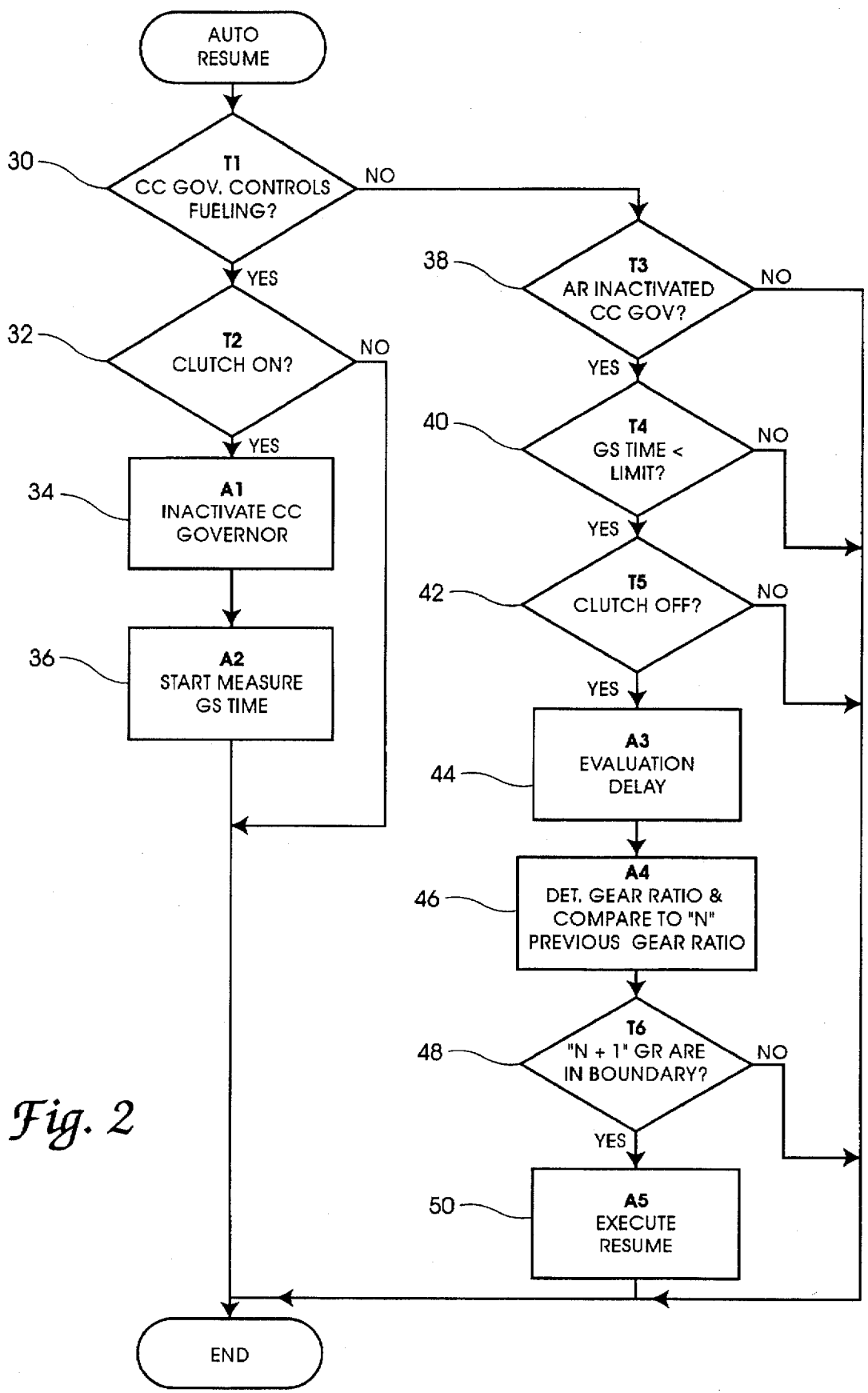
FIG. 2 is a flow chart of a first embodiment detailed automatic resume method of the present invention.

Referring now to FIG. 2, there is illustrated a first embodiment detailed auto-resume method of the present invention. The method of FIG. 2 begins at step 30 which determines whether engine fueling is being controlled by the cruise control governor (TEST 1). If the cruise control system is determined to be active at step 30, step 32 then determines if the clutch switch is on (TEST 2). If the clutch switch is not on at step 32 (TEST 2=n), indicating that the clutch is engaged, then the algorithm of FIG. 2 does not execute any function and terminates. If, on the other hand, the clutch switch is on at step 32 (TEST 2=y), indicating that the clutch has been disengaged, then the algorithm inactivates the cruise control governor at step 34 (ACTION 1) and starts to measure the "gear switch time" at step 36 (ACTION 2). The gear switch time is a measure of the time between when the vehicle is taken out of gear and when the vehicle is placed back into gear. The algorithm of FIG. 2 then terminates after step 36.

The next time the algorithm of FIG. 2 is executed by the ECM (the algorithm of FIG. 2 is a subroutine in the larger control program executed by the ECM), step 30 will indicate that the cruise control governor is no longer controlling fueling (TEST 1=n) because the cruise control governor was previously inactivated at step 34. Step 38 next determines whether the cruise control governor was inactivated by the auto-resume subroutine of FIG. 2 (TEST 3). This is conveniently indicated in the software by the setting of a flag at step 34. If the cruise control governor is inactive (TEST 1=n), but was not inactivated by the auto-resume subroutine (TEST 3=n), then it is not desired that the cruise control governor be automatically resumed by the algorithm of FIG. 2. Therefore, the auto-resume subroutine terminates.

If, however, step 38 indicates that the cruise control governor was inactivated by the auto-resume subroutine of FIG. 2 (TEST 3=y), then the algorithm proceeds to step 40 which determines if the elapsed gear switch time is less than a predetermined limit (TEST 4). The predefined limit represents the time period in which the transmission must be shifted in order for the cruise control to be automatically resumed. If the elapsed gear switch time is not less than the predetermined limit (TEST 4=n), then the algorithm of FIG. 2 is terminated.

If, however, the gear switch time is still within the allowable predetermined limit (TEST 4=y) then the algorithm continues to step 42, which determines if the clutch pedal switch is off (i.e. the driver has taken his foot off of the clutch pedal and thereby engaged the clutch) (TEST 5). If step 42 determines that the clutch switch is not off (TEST 5=n), which means that the driver still holds his foot on the clutch pedal, then the algorithm is terminated. If, on the other hand, step 42 determines that the clutch has been engaged (TEST 5=y), then the algorithm continues at step 44, where the algorithm executes a programmable delay (ACTION 3) before evaluating whether the transmission has been placed in gear. It will be appreciated by those skilled in the art that the algorithm of FIG. 2 does not reach step 44 until it has determined that the cruise control governor has been inactivated by the auto-resume algorithm, that the gear switch time is within the predetermined limit, and that the clutch has been engaged, as indicated by the clutch position switch being off.

After the time delay at step 44, the algorithm checks the current gear ratio and the previous "n" gear ratios, where "n" is a predetermined, programmable number (ACTION 4). In a preferred embodiment, "n" is at last four. Step 48 then determines if the last "n+1" gear ratios are within a predetermined, programmable boundary (TEST 6). The boundary defines all valid calculated gear ratios of the transmission, accounting for system noise. If the last "n+1" gear ratios are not within the predefined boundary (TEST 6=n), then the transmission is considered to be out of gear and the algorithm terminates. If, on the other hand, step 48 determines that the last "n+1" gear ratios were within the predefined boundary (TEST 6=y), then the transmission is considered to be in gear and the algorithm proceeds to step 50 which automatically executes a resume of the speed control system, returning control of engine fueling to the cruise control governor (ACTION 5). The algorithm then terminates.

It will be appreciated by those skilled in the art that the auto-resume algorithm of FIG. 2 will suspend operation of the cruise control system if the vehicle clutch is disengaged, and automatically resume operation of the vehicle speed control system if the transmission is shifted to another gear within a predetermined time period. Furthermore, the algorithm of FIG. 2 makes the in gear determination without requiring any extra hardware to be added to the vehicle. Specifically, the in gear determination is made by measuring the calculated vehicle gear ratio at predetermined intervals from information provided by the engine speed sensor and the road speed sensor, both of which are already incorporated into existing vehicle control systems. By utilizing this preexisting sensor information to calculate the vehicle gear ratio, and executing the auto-resume function if the calculation determines that the vehicle is in gear, the auto-resume algorithm of FIG. 2 is able to provide the automatic cruise control resume function without incorporating any additional hardware to the vehicle.

Figure 3:
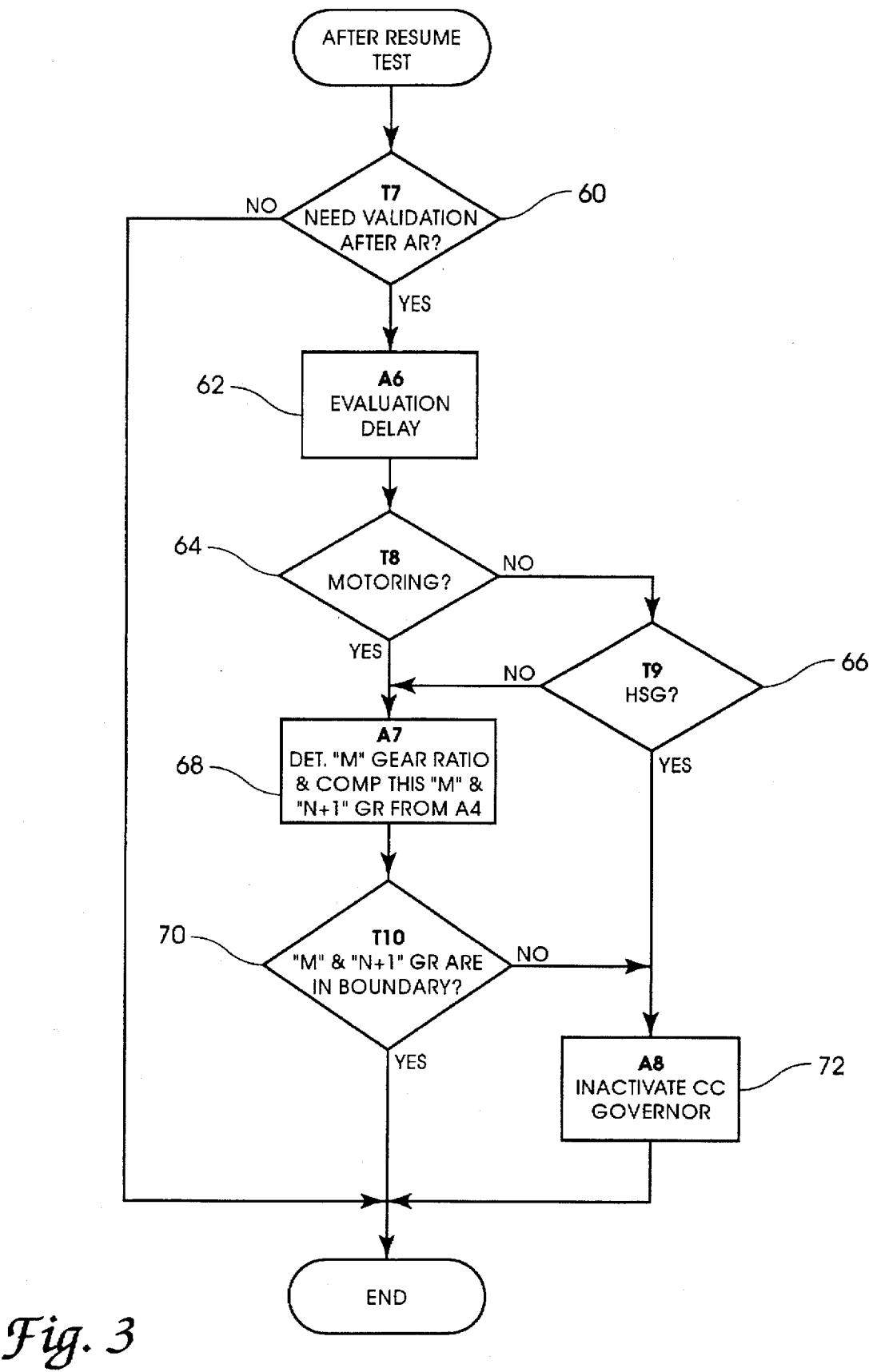
FIG. 3 is a flow chart of a first embodiment after resume test method of the present invention.

After execution of the auto-resume algorithm of FIG. 2, the control system of the present invention executes the after resume test of FIG. 3, in order to validate the correct execution of the auto-resume function. Like the auto-resume algorithm of FIG. 2, the after resume test algorithm of FIG. 3 is intended to be configured as a subroutine which is periodically executed by the main control system software executed by the ECM. The after resume test begins at step 60 which determines if there is a requirement for validation after execution of an auto-resume (TEST 7). This is conveniently indicated by checking a software flag which may be set at step 50 when an auto-resume is executed by the algorithm of FIG. 2. If step 60 determines that an auto-resume has not been executed (TEST 7=n), then the algorithm of FIG. 3 terminates. If, on the other hand, step 60 determines that an auto-resume was executed by the algorithm of FIG. 2 and validation is required (TEST 7=y), then the algorithm proceeds to step 62, which executes a programmable evaluation delay (ACTION 6). After the evaluation delay time, step 64 checks the vehicle engine fueling for a "motoring" condition (TEST 8). A motoring condition is indicated by fuel being supplied to the engine at a rate which is below a predetermined limit. If no motoring condition is determined at step 64 (TEST 8=n), then the algorithm proceeds to step 66 which determines whether the highspeed governor is controlling the engine fueling (TEST 9).

If step 64 determines that there is a motoring condition (TEST 8=y) or if step 66 determines that the highspeed governor is not controlling engine fueling (TEST 9=n), then the algorithm of FIG. 3 proceeds to step 68 which determines the value of the last "m" calculated gear ratios (ACTION 7), where "m" is a predetermined and programmed variable. Step 70 next determines if the last "m" calculated gear ratios and the previously calculated "n+1" gear ratios from step 46 of FIG. 2 (ACTION 4) are within a predetermined and programmable boundary (TEST 10).

If step 70 determines that these calculated gear ratios are not within the predetermined boundary (TEST 10=n), or if step 66 determines that the highspeed governor is controlling the engine fueling (TEST 9=y), then the algorithm proceeds to step 72 where the cruise control governor is inactivated (ACTION 8). The algorithm terminates after step 72.

If, however, step 70 determines that the calculated gear ratios are within the predetermined boundary (TEST 10=y), then the vehicle, after execution of the auto-resume function, is considered to be in gear, which means that the auto-resume function is considered to be validated. The algorithm of FIG. 3 therefore terminates.

Figure 4:
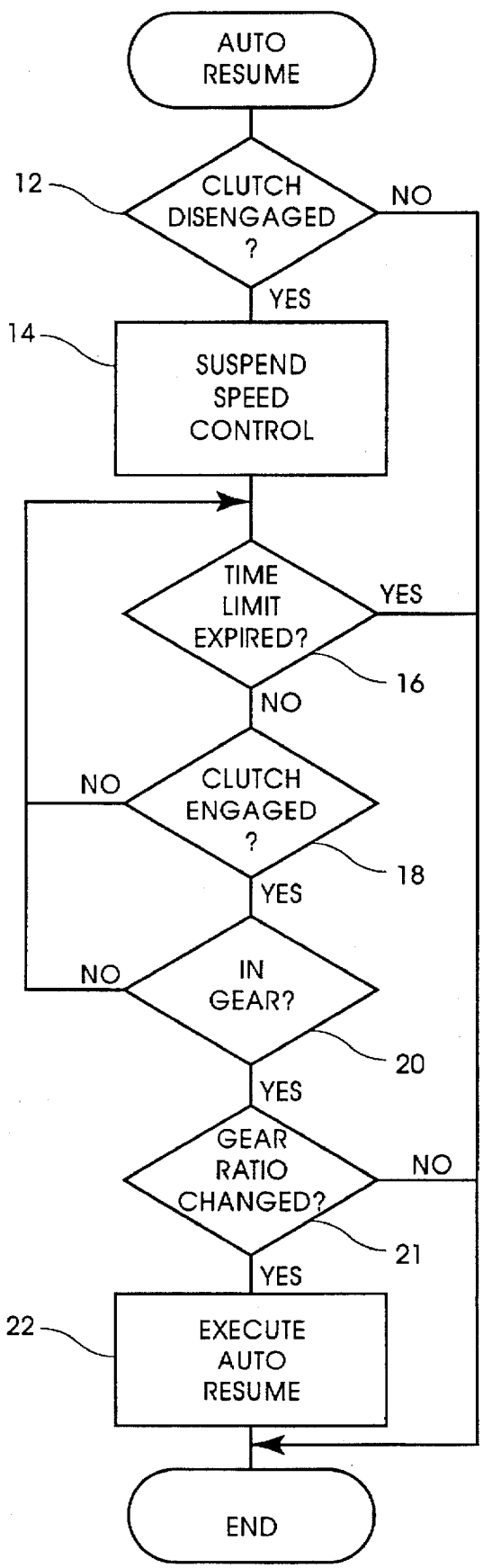
FIG. 4 is a flow chart of a second embodiment gross automatic resume method of the present invention.

The control systems of FIGS. 1 and 2 may optionally be modified to include the requirement that the transmission be shifted into a different gear in order for the auto-resume function to be executed. For example, FIG. 4 illustrates a flow chart of a second embodiment gross (non-detailed) automatic resume method of the present invention. The second embodiment method of FIG. 4 is identical to the first embodiment method of FIG. 1 with the addition of step 21 which requires that a different gear be selected in order for the auto-resume function to be executed at step 22.

Figure 5:
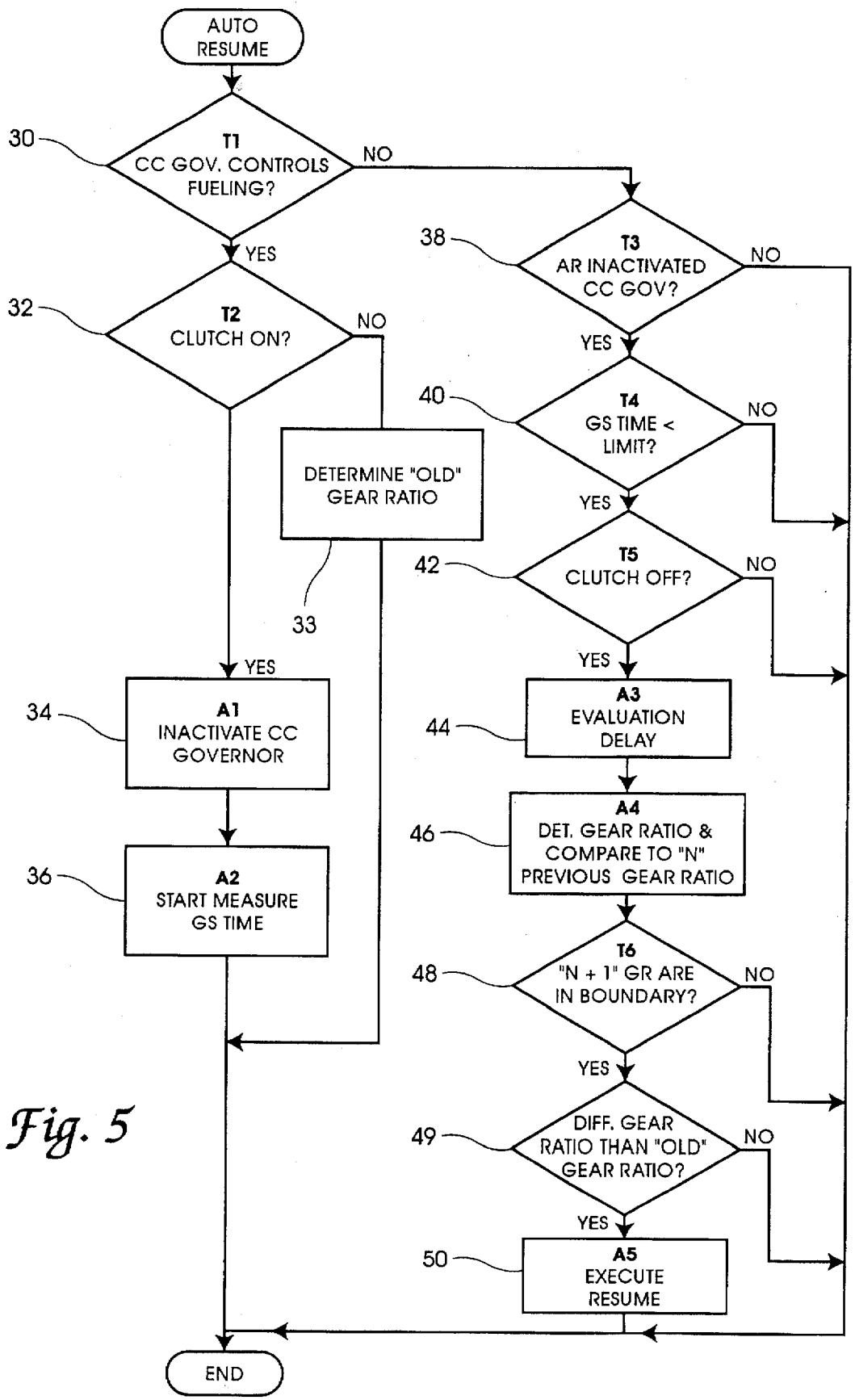
FIG. 5 is a flow chart of a second embodiment detailed automatic resume method of the present invention.

Similarly, FIG. 5 illustrates a flow chart of a second embodiment detailed auto-resume method of the present invention. The second embodiment method of FIG. 5 is identical to the first embodiment method of FIG. 2 with the addition of two steps. First, step 33 determines the value of the selected gear ratio prior to clutch disengagement (the "old" gear ratio). Secondly, step 49 requires that a different gear be selected (different from the "old" gear ratio recorded at step 33) in order for the auto-resume function to be executed at step 50.

In light of the forgoing, it will be appreciated by those skilled in the art that the phrase "gear change" as used herein and in the appended claims may refer to either the situation where the clutch is disengaged and then engaged with the selected gear ratio remaining the same or the situation where the clutch is disengaged and then engaged with the selected gear ratio changing during this period.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for automatic suspension and resumption of a vehicle speed control system during a gear change of a manual transmission of the vehicle, comprising the steps of:
   (a) sensing a start of the gear change;
   (b) suspending operation of the speed control system;
   (c) beginning measurement of an elapsed time;
   (d) sensing a completion of the gear change; and
   (e) resuming operation of the speed control system if the elapsed time is less than a predetermined limit.

2. The method of claim 1, wherein step (a) comprises sensing disengagement of a clutch of the vehicle.

3. The method of claim 1, wherein step (d) comprises the steps of:
   (d.1) sensing engagement of a clutch of the vehicle; and
   (d.2) sensing that the manual transmission is in gear.

4. The method of claim 3, wherein step (d.2) comprises the steps of:
   (d.2.1) determining an engine speed of the vehicle;
   (d.2.2) determining a road speed of the vehicle; and
   (d.2.3) calculating a gear ratio of the transmission from the engine speed and the road speed.

5. The method of claim 4, further comprising the steps of:
   (d.2.4) repeating steps (d.2.1), (d.2.2) and (d.2.3) a plurality of times to calculate a plurality of successive gear ratios; and
   (d.2.5) determining that the manual transmission is in gear if each of the plurality of successive gear ratios are within a predetermined boundary.

6. A method for automatic suspension and resumption of a vehicle speed control system during a gear change of a manual transmission of the vehicle, comprising the steps of:
   (a) sensing disengagement of a clutch of the vehicle;
   (b) suspending operation of the speed control system upon disengagement of the clutch;
   (c) beginning measurement of an elapsed time upon the suspension of operation of the speed control system;
   (d) sensing a completion of the gear change;
   (e) completing measurement of the elapsed time upon the completion of the gear change; and
   (f) resuming operation of the speed control system if the elapsed time is less than a predetermined limit.

7. The method of claim 6, wherein step (a) comprises reading a sensor operative to indicate a position of a clutch pedal of the vehicle.

8. The method of claim 6, wherein step (d) comprises the steps of:
   (d.1) sensing engagement of a clutch of the vehicle; and
   (d.2) sensing that the manual transmission is in gear.

9. The method of claim 8, wherein step (d.2) comprises the steps of:
   (d.2.1) determining an engine speed of the vehicle;
   (d.2.2) determining a road speed of the vehicle; and
   (d.2.3) calculating a gear ratio of the transmission from the engine speed and the road speed.

10. The method of claim 9 further comprising the steps of:
    (d.2.4) repeating steps (d.2.1), (d.2.2) and (d.2.3) a plurality of times to calculate a plurality of successive gear ratios; and
    (d.2.5) determining that the manual transmission is in gear if each of the plurality of successive gear ratios are within a predetermined boundary.

11. A method for automatic suspension and resumption of a vehicle speed control system during a gear change of a manual transmission of the vehicle, comprising the steps of:
    (a) sensing disengagement of a clutch of the vehicle;
    (b) suspending operation of the speed control system upon disengagement of the clutch;
    (c) beginning measurement of an elapsed time upon the suspension of operation of the speed control system;
    (d) terminating the method if a current value of the elapsed time is not less than a predetermined limit;
    (e) determining whether the clutch of the vehicle has been engaged;
    (f) waiting for a predetermined time period;
    (g) determining a current gear ratio of the vehicle after expiration of the predetermined time period;
    (h) retrieving a plurality of previously determined gear ratios of the vehicle; and
    (i) resuming operation of the speed control system if the current gear ratio and the plurality of previously determined gear ratios are all within a predetermined boundary.

12. The method of claim 11, wherein steps (a) and (e) comprise reading a sensor operative to indicate a position of a clutch pedal of the vehicle.

13. The method of claim 11, where step (g) comprises the steps of:

(g.2.1) determining an engine speed of the vehicle;

(g.2.2) determining a road speed of the vehicle; and (g.2.3) calculating a gear ratio of the transmission from the engine speed and the road speed.

14. A method for automatic suspension and resumption of a vehicle speed control system during a gear change of a manual transmission of the vehicle, comprising the steps of:

(a) sensing a start of the gear change;

(b) suspending operation of the speed control system;

(c) beginning measurement of an elapsed time;

(d) sensing a completion of the gear change;

(e) resuming operation of the speed control system if the elapsed time is less than a predetermined limit; and (f) validating the resumption of the operation of the speed control system.

15. The method of claim 14, wherein step (d) comprises the steps of:

(d.1) sensing engagement of a clutch of the vehicle; and (d.2) sensing that the manual transmission is in gear.

16. The method of claim 15, wherein step (d.2) comprises the steps of:

(d.2.1) determining an engine speed of the vehicle;

(d.2.2) determining a road speed of the vehicle; and (d.2.3) calculating a gear ratio of the transmission from the engine speed and the road speed.

17. The method of claim 16, further comprising the steps of:

(d.2.4) repeating steps (d.2.1), (d.2.2) and (d.2.3) a first plurality of times to calculate a first plurality of successive gear ratios; and (d.2.5) determining that the manual transmission is in gear if each of the first plurality of successive gear ratios are within a predetermined boundary.

18. The method of claim 17, wherein step (f) comprises the steps of:

(f.1) repeating steps (d.2.1), (d.2.2) and (d.2.3) a second plurality of times to calculate a second plurality of successive gear ratios; and (f.2) validating the resumption of the operation of the speed control system by determining that the manual transmission is in gear if each of the first and second plurality of successive gear ratios are within the predetermined boundary.

19. The method of claim 18, wherein steps (f.1) and (f.2) are performed only if a motoring condition is detected.

20. The method of claim 14, wherein step (f) comprises the steps of:

(f.1) determining if a motoring condition exists;

(f.2) determining if a highspeed governor controls fueling of the vehicle; and (f.2) suspending operation of the speed control system if there is no motoring condition and the highspeed governor controls fueling of the vehicle.

* * * * *

UNITED STATES PATENT AND TRADEMARK OFFICE
CERTIFICATE OF CORRECTION

PATENT NO : 5,680,309
DATED : October 21, 1997
INVENTOR(S) : Rauznitz, et al.

It is certified that error appears in the above-identified patent and that said Letters Patent is hereby corrected as shown below:

In column 7, line 31, "forgoing" should be --foregoing--.

Signed and Sealed this

Seventh Day of December, 1999

Attest:

Q. TODD DICKINSON

*Attesting Officer*   *Acting Commissioner of Patents and Trademarks*